(12) United States Patent
Sasaki

(10) Patent No.: US 9,731,461 B2
(45) Date of Patent: Aug. 15, 2017

(54) TIRE CURING MOLD AND METHOD OF MANUFACTURING TIRE

(71) Applicant: TOYO TIRE & RUBBER CO., LTD., Osaka-shi, Osaka (JP)

(72) Inventor: Koya Sasaki, Osaka (JP)

(73) Assignee: TOYO TIRE & RUBBER CO., LTD., Osaka-shi (JP)

( * ) Notice: Subject to any disclaimer, the term of this patent is extended or adjusted under 35 U.S.C. 154(b) by 400 days.

(21) Appl. No.: 14/474,544

(22) Filed: Sep. 2, 2014

(65) Prior Publication Data
US 2015/0097314 A1    Apr. 9, 2015

(30) Foreign Application Priority Data

Oct. 4, 2013   (JP) .................................. 2013-208904

(51) Int. Cl.
*B29D 30/06*      (2006.01)
*B29C 33/10*      (2006.01)

(52) U.S. Cl.
CPC .......... *B29D 30/0606* (2013.01); *B29C 33/10* (2013.01); *B29D 2030/0617* (2013.01)

(58) Field of Classification Search
None
See application file for complete search history.

(56) References Cited

U.S. PATENT DOCUMENTS 5,415,826 A * 5/1995 Lange ................. B29C 33/0055
                                                                264/161
2002/0162941 A1* 11/2002 Hanya .................... B29C 33/10
                                                                249/103

FOREIGN PATENT DOCUMENTS

| JP | 08-047929 | * | 2/1996 |
| JP | 8-47929 A | | 2/1996 |
| JP | H11165319 | * | 6/1999 |
| JP | 2008-265502 A | | 11/2008 |

* cited by examiner

*Primary Examiner* — Matthew Daniels
*Assistant Examiner* — Manley Cummins, IV
(74) *Attorney, Agent, or Firm* — Westerman, Hattori, Daniels & Adrian, LLP

(57) ABSTRACT

A tire curing mold comprises a plurality of vent holes provided on a side forming surface coming into contact with a side wall portion of a tire. The side forming portion is provided with a recess portion which is recessed toward an outer side in a tire width direction from a profile of the side forming surface. A diameter of a vent hole which is open within the recess portion is set to be larger than a diameter of a vent hole which is open on the profile of the side forming surface.

5 Claims, 1 Drawing Sheet

TIRE CURING MOLD AND METHOD OF MANUFACTURING TIRE

BACKGROUND OF THE INVENTION

Field of the Invention

The present invention relates to a tire curing mold in which a plurality of vent holes are provided in a side forming surface coming into contact with a side wall portion of a tire, and a method of manufacturing a tire using the tire curing mold.

Description of the Related Art

Conventionally, in a tire curing mold which is used for curing a pneumatic tire, a plurality of vent holes are provided in a side forming surface which comes into contact with a side wall portion of the tire (refer, for example, to Patent Documents 1 and 2). With the structure mentioned above, extra air between the tire and the side forming surface is discharged outside the mold. As a result, it is possible to prevent generation of air accumulation causing a rubber fracture which is called as lightness or bare, and it is possible to achieve formation of a good tire appearance.

On the other hand, there has been known a pneumatic tire in which a projection portion is provided on a surface of a side wall portion. The projection portion constitutes, for example, a display of letters, numerical characters and figures for enhancing a design property and a decorative property, or constitutes a rib for improving a traveling property and an external damage resistance on a bad road such as a rocky area. In this case, a recess portion corresponding to the projection portion is provided on the side forming surface of the tire curing mold.

However, since the recess portion mentioned above is deeper than a profile of the side forming surface, it takes a long time to fill the recess portion with a required amount of rubber at the curing time, and a rubber flow within the recess portion tends to be lowered. As a result, the air accumulation tends to be generated within the recess portion, and there is a concern that the appearance of the tire is deteriorated by the rubber fracture of the projection portion caused by the air accumulation.

PRIOR ART DOCUMENT

Patent Document

Patent Document 1: JP-A-2008-265502
Patent Document 2: JP-A-8-47929

SUMMARY OF THE INVENTION

The present invention is made by taking the actual condition mentioned above into consideration, and an object of the present invention is to provide a tire curing mold which can suppress generation of air accumulation within a recess portion, and a method of manufacturing a tire using the tire curing mold.

The object can be achieved by the present invention having the following structure. That is, the present invention provides a tire curing mold comprising a plurality of vent holes which are provided on a side forming surface coming into contact with a side wall portion of a tire, wherein the side forming portion is provided with a recess portion which is recessed toward an outer side in a tire width direction from a profile of the side forming surface, and wherein a diameter of a vent hole which is open within the recess portion is set to be larger than a diameter of a vent hole which is open on the profile of the side forming surface.

In the tire curing mold, since a diameter of a vent hole which is open within the recess portion is larger than a diameter of a vent hole which is open on the profile, the rubber at the curing time is aggressively brought in the recess portion. As a result, the air is spread as well as a rubber flow within the recess portion is promoted, and the generation of the air accumulation within the recess portion can be suppressed. Further, since the reduction of the rubber flow does not appear on the profile of the side forming surface, it is possible to appropriately secure a rubber thickness which is necessary in the tire, without unnecessarily sucking the rubber, by making the diameter of the vent hole which is open onto the profile relatively small.

It is preferable that a diameter of a vent hole which is open within a first recess portion is set to be larger than a diameter of a vent hole which is open within a second recess portion, and the diameter of the vent hole which is open within the second recess portion is set to be larger than the diameter of the vent hole which is open on the profile of the side forming surface, in the case that the recess portion includes the first recess portion in which a recess amount is relatively large, and the second recess portion in which a recess amount is relatively small. As a result, since the rubber flow within the recess portion becomes larger in correspondence to the recess amount of the recess portion, it is possible to suppress the generation of the air accumulation by improving the rubber flow suitable for each of the positions.

It is preferable that the diameter of the vent hole which is open within the recess portion is set to be equal to or less than 2.2 mm. As a result, it is possible to prevent the rubber projection formed by the rubber flowing into the vent hole from becoming too large, and it is possible to prevent a trimming work of the rubber projection from being complicated. Further, the diameter of the vent hole which is open onto the profile of the side forming surface is preferably set to be equal to or more than 0.6 mm, for securing an exhaust performance by the vent hole.

Further, the present invention provides a method of manufacturing a tire, including steps of setting an uncured tire to a cavity of the tire curing mold as mentioned above, and carrying out cure by applying a heating and pressurizing treatment to the uncured tire. According to the method mentioned above, since the generation of the air accumulation can be prevented by promoting the rubber flow within the recess portion as mentioned above, it is possible to form a good tire appearance.

DETAILED DESCRIPTION OF THE PREFERRED EMBODIMENTS

An embodiment of the present invention will be explained with reference to the drawings.

Figure 1:
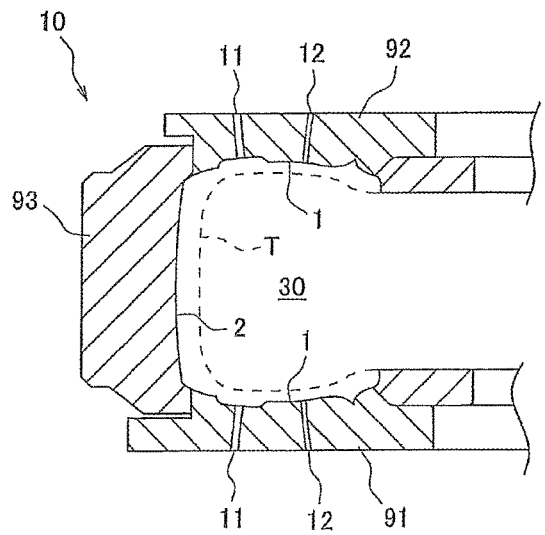
FIG. 1 is a vertical cross sectional view schematically showing an example of a tire curing mold according to the present invention.

An uncured tire T shown its profile by a broken line is set to a tire curing mold 10 shown in FIG. 1 in a state in which a tire axis is directed vertically. In other words, in FIG. 1, a vertical direction is a tire width direction, and a lateral direction is a tire diametrical direction. The tire curing mold 10 is provided with a side forming surface 1 which comes into contact with a side wall portion of the tire T set to a cavity 30, and a tread forming surface 2 which comes into contact with a tread portion of the tire T. The side forming surface 1 is provided with a plurality of vent holes 11 and 12 which communicate an inner portion (the cavity 30) of the mold 10 and outside, for discharging extra air between the tire T and the side forming surface 1 at the curing time.

The tire curing mold 10 is provided with side plates 91 and 92 which form the side wall portion of the tire T, and an annular tread ring 93 which forms the tread portion of the tire T. The side forming surface 1 constitutes an inner surface of each of the side plates 91 and 92, and the tread forming surface 2 constitutes an inner surface of the tread ring 93. Although an illustration is omitted, a projection-recess pattern corresponding to a tread pattern is formed in the tread forming surface 2, and a plurality of vent holes which are open in the tread forming surface 2 are provided in the tread forming surface 2.

The mold 10 is a so-called segmented mold, and the tread ring 93 is constituted by a plurality of sectors which are separated in a tire circumferential direction. When opening the mold, the side plate 92 and the tread ring 93 move up, and are displaced to an outer side in a tire diametrical direction in such a manner that each of the sectors expands radially, so that the tire can be taken in and out. When closing the mold, the sectors gather together and the tread ring 93 is formed like a continuous annular ring, thereby achieving a state in which the side forming surface 1 and the tread forming surface 2 can stick to the outer surface of the tire T as shown in FIG. 1.

Figure 2:
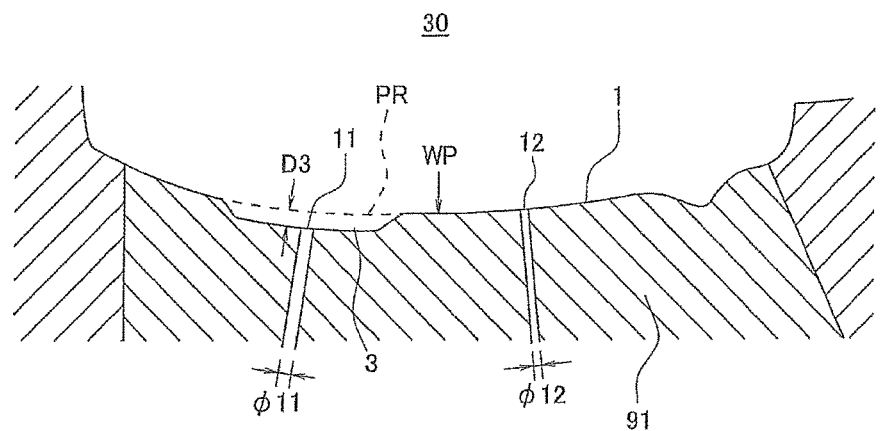
FIG. 2 is an enlarged view of a side forming surface.

As shown in FIG. 2 in an enlarged manner, the side forming surface 1 is provided with a recess portion 3 which is recessed toward an outer side in a tire width direction from a profile PR of the side forming surface 1. As a result, a projection portion corresponding to the recess portion 3 is provided on a surface of the side wall portion of the tire which is cured by using the mold 10. The projection portion constitutes, for example, a display of letters, numerical characters and figures for enhancing a design property and a decorative property of the tire, or constitutes a rib for improving a traveling property and an external damage resistance on a bad road such as a rocky area.

The profile PR of the side forming surface 1 is formed by a circular arc which has its center in a cavity 30 side, and is formed into a projection shape to an outer side in a tire width direction. The circular arc constituting the profile PR may be constituted by a single circular arc, however, may be constituted by smoothly connecting a plurality of circular arcs having different radii of curvature. The recess portion 3 is arranged closer to the outer side in the tire diametrical direction than the maximum width point WP, however, may be arranged astride the maximum width point WP. The maximum width point WP is a point which is positioned in the outermost side in the tire width direction in the profile PR, and is defined based on the profile PR even in the case that the recess portion 3 is arranged astride the maximum width point WP (refer to FIG. 3).

The side plate 91 is provided with a portion for forming a rim protector of the bead portion. The portion faces a circular arc which extends toward an outer side in the tire diametrical direction from a bead heel and forms a projection shape to an inner side in the tire width direction while having a center in a tire outer side. The maximum width point WP is defined except the portion for forming the rim protector, and does not take the portion into consideration even in the recess portion which is recessed from the profile PR.

It takes a long time to fill the recess portion 3 with a required amount of rubber at the curing time, in comparison with the position where the recess portion 3 is not provided, and the situation tends to appear in the case that a recess amount D3 of the recess portion 3 goes beyond 2 mm. Thus, it is preferable to relatively enlarge a diameter of the vent hole as mentioned later at least in the recess portion in which the recess amount goes beyond 2 mm. In the present embodiment, the recess portion 3 in which the recess amount D3 goes beyond 3 mm is exemplified, however, there may be cases that the recess amount D3 goes beyond 5 mm, and goes beyond 7 mm. The recess amount D3 is a depth of the recess portion 3 based on the profile PR, and is measured along a normal direction of the profile PR.

In the metal mold 10, a diameter $\phi 11$ of a vent hole 11 which is open within the recess portion 3 is set to be larger than a diameter $\phi 12$ of a vent hole 12 which is open on the profile PR of the side forming surface 1, and the rubber is accordingly sucked into the recess portion 3 aggressively at the curing time. As a result, the air is spread as well as a rubber flow within the recess portion 3 is promoted, and the generation of the air accumulation within the recess portion 3 can be suppressed. Further, a problem that the rubber flow is lowered does not exist on the profile PR of the side forming surface 1 since the recess portion 3 is not provided on the profile PR, and it is possible to appropriately secure a rubber thickness which is necessary in the tire, without unnecessarily sucking the rubber, by making the diameter $\phi 12$ of the vent hole 12 relatively small.

As mentioned above, the vent hole 11 focuses on an action of promoting the rubber flow within the recess portion 3 by sucking the rubber rather than an original action of letting out the extra air, and is configured so as to achieve the air spread within the recess portion 3 by aggressive movement of the rubber. In the case that the air within the recess portion 3 is appropriately dispersed, the generation of the air accumulation is suppressed. As a result, the rubber fracture of the projection portion can be prevented and a good tire appearance can be obtained.

In order to achieve the action mentioned above, it is effective to set the vent hole 11 at a position where the recess amount D3 is the greatest. In the present embodiment, the vent hole 11 is open in a center portion of a bottom surface of the recess portion 3 which is formed into a trapezoidal shape in its cross section. Since the vent hole 11 is configured so as to promote the rubber flow within the recess portion 3 by sucking the rubber, it is not necessary to set the vent hole 11 in a corner portion even in the case that the air accumulation tends to be generated in the corner portion of the recess portion 3. Of course, the vent hole 11 may be set in the corner portion of the recess portion 3.

The diameter $\phi 11$ of the vent hole 11 is preferably set to be equal to or more than 0.8 mm in the light of securing the effect of promoting the rubber flow within the recess portion 3 by sucking the rubber, and is preferably set to be equal to or less than 2.2 mm for preventing a trimming work of the rubber projection from being complicated. The rubber projection is formed on a surface of the side wall portion of the tire after the cure, by the rubber flowing into the vent hole 11, and is called also as a spew. Further, the diameter $\phi 12$ of the vent hole 12 is preferably set to be equal to or more than 0.6 mm for securing an exhausting performance by the vent hole 12.

From a practical standpoint, the diameter of the vent hole which is relatively larger is preferably set to 1.2 times to 1.4 times of the diameter of the vent hole which is relatively smaller. Therefore, in the vent holes 11 and 12 which are different in the diameter sizes from each other, it is preferable that the diameter $\phi 11$ is 1.2 times to 1.4 times of the diameter $\phi 12$. In the diameter based on the change ratio, an extra digit is rounded off by taking into consideration an effective digit number.

The vent holes 11 and 12 are provided in the same manner as the side plate 91 on the side forming surface 1 of the side plate 92 which is not shown in FIG. 2. Further, a lot of vent holes 11 and 12 are arranged so as to be spaced in the tire circumferential direction, respectively. The vent holes 11 and 12 may not appear on the same tire meridian cross section.

Figure 3:
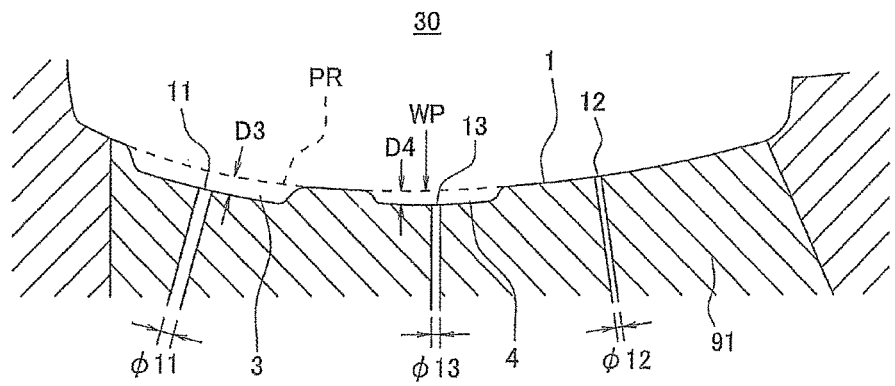
FIG. 3 is an enlarged view of a side forming surface according to another embodiment of the present invention.

FIG. 3 shows a side forming surface according to another embodiment of the present invention. Since the same structures and actions as those of the embodiment mentioned above are employed except the structures described below, a description will be mainly given of different points while omitting common points. Further, the same reference numerals are attached to the same structures as the structures which are provided already, and an overlapping description will be omitted.

As shown in FIG. 3, the side forming surface 1 is provided with a plurality of (two in the present embodiment) recess portions 3 and 4 which are positioned away from each other in a tire diametrical direction, and is not provided with a portion for forming the rim protector of the bead portion. A recess amount D3 of the recess portion 3 is set to be larger than a recess amount D4 of the recess portion 4. Therefore, in the present embodiment, the recess portion provided in the side forming surface 1 includes the recess portion 3 (corresponding to a first recess portion) in which the recess amount D3 is relatively large, and the recess portion 4 (corresponding to a second recess portion) in which the recess amount D4 is relatively small.

In this example, a diameter $\phi 11$ of a vent hole 11 which is open within the recess portion 3 is set to be larger than a diameter $\phi 13$ of a vent hole 13 which is open within the recess portion 4. In addition, the diameter $\phi 13$ of the vent hole 13 which is open within the recess portion 4 is set to be larger than a diameter $\phi 12$ of a vent hole 12 which is open on a profile PR of the side forming surface 1. As a result, since the rubber flow within the recess portions 3 and 4 becomes larger in correspondence to the recess amounts of the recess portions 3 and 4, it is possible to inhibit the air accumulation from being generated by improving the rubber flow suitable for each of the positions.

The diameter $\phi 11$ of the vent hole 11 is preferably set to be equal to or more than 0.8 mm in the light of securing the effect of promoting the rubber flow within the recess portion 3 by sucking the rubber, and is preferably set to be equal to or less than 2.2 mm for preventing a trimming work of the rubber projection from being complicated. Further, the diameter $\phi 12$ of the vent hole 12 is preferably set to be equal to or more than 0.6 mm for securing an exhausting performance by the vent hole 12. The diameter $\phi 13$ of the vent hole 13 is set to a size which is between size of the diameter $\phi 11$ and size of the diameter $\phi 12$.

From a practical standpoint, the diameter of the vent hole which is relatively larger is preferably set to 1.2 times to 1.4 times of the diameter of the vent hole which is relatively smaller. In three kinds of vent holes 11 to 13 which are different in their diameter sizes from one another, it is preferable that the diameter $\phi 11$ is 1.2 times to 1.4 times of the diameter $\phi 13$, and the diameter $\phi 13$ is 1.2 times to 1.4 times of the diameter $\phi 12$. In the diameter based on the change ratio, an extra digit is rounded off by taking into consideration an effective digit number. The setting of relatively differentiating the diameters of the vent holes is preferably applied to the recess portion in which the difference in the recess amount is equal to or more than 1 mm (the recess portion 3 and the recess portion 4 in the present embodiment).

FIG. 2 exemplifies two kinds of vent holes in which the sizes of diameters are different from each other, and FIG. 3 exemplifies three kinds of vent holes in which the sizes of diameters are different from one another. However, four or more kinds of vent holes may be applied. Further, in the embodiments mentioned above, there is shown the example in which the vent holes are formed by the round holes having a fixed diameter, however, the vent holes are not limited to this, but may be formed, for example, into a shape having a counter boring in an opening portion. In this case, a diameter of the vent hole is not measured at the counter boring but is measured at a main body portion of the vent hole.

A manufacturing method of the tire using the metal mold 10 includes steps of setting an uncured tire to the cavity 30 of the mold 10 and carrying out the cure by applying a heating and pressurizing treatment to the uncured tire. In the mold 10, since it is possible to prevent the air accumulation from being generated within the recess portion as mentioned above, it is possible to manufacture a pneumatic tire having a good tire appearance without any rubber fracture in the projection portion on the side wall portion.

The tire curing mold according to the present invention may be the same as the normal tire curing mold except the structure as mentioned above of the vent hole provided in the side forming surface, and the conventionally known shapes, materials and mechanisms can be employed in the present invention.

The present invention is not limited to the embodiments mentioned above, but can be modified and changed variously within the scope which does not deviate from the spirit of the present invention. Therefore, for example, in the embodiments mentioned above, the tire curing mold is, but not limited to, constituted by the segmented mold, and may be constituted by a so-called two-piece mold in which the mold is separated into two pieces vertically in a center portion of the tread portion.

EXAMPLES

In order to specifically show the structures and the effects of the present invention, generation condition of the air accumulation was confirmed by carrying out the curing of the tire. The tire curing mold used for evaluation is provided with the side forming surface shown in FIG. 3, the recess amount of the recess portion 3 is 3.5 mm, and the recess amount of the recess portion 4 is 2.5 mm. In the case that the formed tire had an appearance defect due to the rubber fracture of the projection, mark "X" was set by assuming that the air accumulation was generated at the curing time, and in the case that any rubber fracture did not exist in the projection and a good tire appearance was obtained, mark "○" was set by assuming that the air accumulation was not generated at the curing time.

TABLE 1

| | | Comparative example 1 | Comparative example 2 | Working example 1 | Working example 2 |
|---|---|---|---|---|---|
| Diameter (mm) of vent hole | φ11 | 0.6 | 0.6 | 0.9 | 1.1 |
| | φ13 | 0.6 | 0.8 | 0.7 | 0.8 |
| | φ12 | 0.6 | 1.1 | 0.6 | 0.6 |
| Generation of air accumulation | | X | X | ○ | ○ |

In the comparative example 1, the air accumulation was generated in both of the recess portions 3 and 4, and was more frequently confirmed particularly in the recess portion 3. In the comparative example 2, the air accumulation was generated in the recess portion 3. Further, in Comparative example 2, since the diameter of the vent hole which is open on the profile of the side forming surface is unnecessarily large, there is a concern of securement of the rubber thickness in the tire thickness around the vent hole. On the contrary, in the working examples 1 and 2, it was possible to inhibit the air accumulation from being generated.

What is claimed is:

1. A tire curing mold comprising:
   a plurality of vent holes which are provided on a side forming surface coming into contact with a side wall portion of a tire,
   wherein the side forming portion is provided with a recess portion which is recessed toward an outer side in a tire width direction from a profile of the side forming surface, and
   wherein a diameter of a vent hole which is open within the recess portion is set to be larger than a diameter of a vent hole which is open on the profile of the side forming surface.

2. The tire curing mold according to claim 1, wherein the recess portion includes a first recess portion in which a recess amount is relatively large, and a second recess portion in which a recess amount is relatively small, and
   wherein a diameter of a vent hole which is open within the first recess portion is set to be larger than a diameter of a vent hole which is open within the second recess portion, and the diameter of the vent hole which is open within the second recess portion is set to be larger than the diameter of the vent hole which is open on the profile of the side forming surface.

3. The tire curing mold according to claim 1, wherein the diameter of the vent hole which is open within the recess portion is set to be equal to or less than 2.2 mm.

4. The tire curing mold according to claim 1, wherein the diameter of the vent hole which is open on the profile of the side forming surface is set to be equal to or more than 0.6 mm.

5. A method of manufacturing a tire, including steps of setting an uncured tire to a cavity of the tire curing mold according to claim 1, and carrying out cure by applying a heating and pressurizing treatment to the uncured tire.

\* \* \* \* \*